United States Patent [19]

Tuominen et al.

[11] Patent Number: 5,638,986
[45] Date of Patent: Jun. 17, 1997

[54] METHOD AND EQUIPMENT FOR DOSING SMALL AMOUNTS OF LIQUID QUANTITATIVELY

[75] Inventors: Pertti Tuominen, Espoo; Niilo Kaartinen, Kuusisto; Unto Okkonen, Masala, all of Finland

[73] Assignee: Fluilogic Systems Oy, Espoo, Finland

[21] Appl. No.: 623,738

[22] Filed: Mar. 29, 1996

Related U.S. Application Data

[63] Continuation of Ser. No. 256,143, filed as PCT/FI93/00451, Nov. 5, 1993, abandoned.

[30] Foreign Application Priority Data

Nov. 6, 1992 [FI] Finland ............ 925025

[51] Int. Cl.$^6$ ............ G01F 11/00
[52] U.S. Cl. ............ 222/1; 222/63; 222/333; 222/207; 222/214; 222/392; 417/472
[58] Field of Search ............ 222/1, 63, 333, 222/207, 214, 392; 92/34, 137; 417/412, 413.2, 472

[56] References Cited

U.S. PATENT DOCUMENTS

| | | | |
|---|---|---|---|
| 1,656,478 | 1/1928 | Geake | 222/392 |
| 3,319,830 | 5/1967 | Ward . | |
| 3,382,811 | 5/1968 | Chastang et al. . | |
| 3,529,908 | 9/1970 | Smith | 417/472 |
| 4,047,851 | 9/1977 | Bender | 417/472 X |
| 4,060,178 | 11/1977 | Miller | 222/333 X |
| 4,344,743 | 8/1982 | Bessman et al. | 417/413.2 X |
| 4,474,309 | 10/1984 | Solomon | 222/63 X |
| 4,631,483 | 12/1986 | Proni et al. . | |
| 4,887,473 | 12/1989 | Proni et al. . | |
| 5,022,556 | 6/1991 | Dency et al. | 222/63 X |
| 5,150,820 | 9/1992 | McGill | 92/34 X |
| 5,285,966 | 2/1994 | Czech | 222/214 |

FOREIGN PATENT DOCUMENTS

| | | |
|---|---|---|
| 1498969 | 11/1968 | Germany . |
| 2447646 | 4/1976 | Germany . |
| 3537737 | 4/1987 | Germany . |
| WO/8704785 | 8/1987 | WIPO . |

*Primary Examiner*—Joseph Kaufman
*Attorney, Agent, or Firm*—Oblon, Spivak, McClelland, Maier & Neustadt, P.C.

[57] ABSTRACT

The invention relates to a method and equipment for quantitatively dosing small amounts of liquid, especially in clinical or other similar wet-chemical analyzers. The dosing employs a liquid space, the volume of which can be changed and which is connected to a dosing channel so that, by increasing or decreasing the volume of the liquid space, a suction or an injection through the dosing channel is achieved. The liquid space is formed by flexible bellows which are freely movable back and forth to provide the reversible deformations which change the volume of the liquid space. The movements are effected using an actuator which is connected to the bellows without transmissions containing sliding surfaces. The actuator comprises precisely repeatable positions and is calibrated according to the invention by measuring the sizes of the dosages produced by the movements between the positions. The dosing is effected after that by selectively repealing the calibrated movements. The actuator can be formed by a stepper motor, and a cam shaft rotated by the stepper motor propelling the bellows back and forth. The nonlinear interdependent relationship between the rotation of the shaft and the change in the volume of the liquid space makes possible a wide range of calibrated dosage sizes.

26 Claims, 4 Drawing Sheets

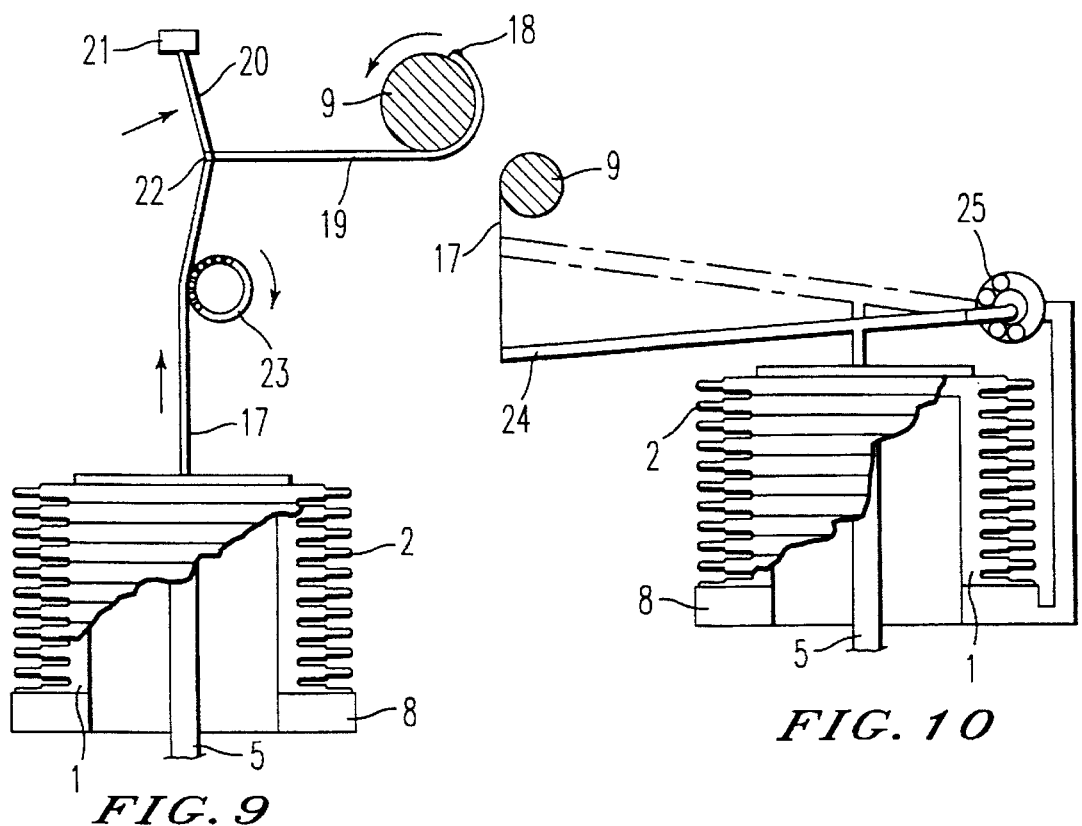
FIG. 9
FIG. 10
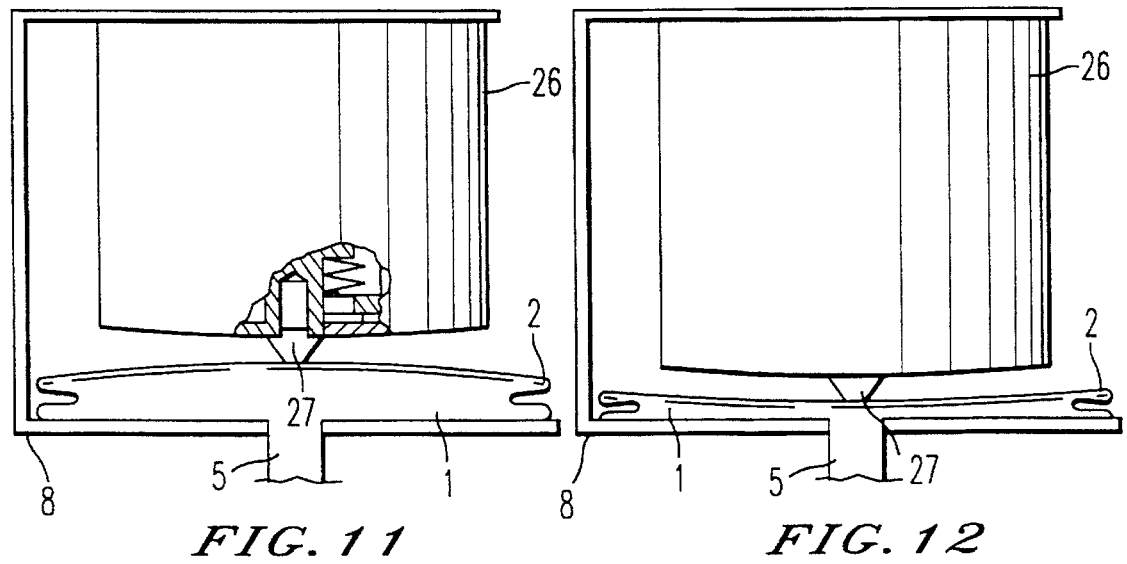
FIG. 11
FIG. 12

METHOD AND EQUIPMENT FOR DOSING SMALL AMOUNTS OF LIQUID QUANTITATIVELY

This application is a continuation of application Ser. No. 08/256,143, filed on Sep. 28, 1994, now abandoned which was filed as PCT application PCT/FI93/00451 on Nov. 5, 1993.

BACKGROUND OF THE INVENTION

1. Field of the Invention

The object of this invention is a method for dosing small amounts of liquid in a quantitative way by using a liquid space, the volume of which is changeable and which is connected to a dosing channel so that suction or spraying is achieved through the dosing channel by increasing or decreasing the volume of the liquid space.

2. Discussion of the Related Art

In wet-chemical analyzers used for clinical purposes or the like, the dosing of liquid is typically carried out by measuring a few micro liters of a sample and a few tens of micro liters of a reagent and by adding a diluting agent so that the total volume of the dosed item of liquid is about 100–1000 μl. A liquid space, the volume of which is changeable, is used in the dosing, the liquid space being formed by a ground glass cylinder provided with a plunger sealed with teflon, and which communicates with the dosing tip through the channel, the liquid being able to be injected from the tip to a vessel such as a small rinsing basin.

The movement of the plunger in the cylinder, on which the dosing of the liquid is based, is generally provided by a stepper motor which rotates, through a reduction gear and through a cogged belt, and a slot-headed screw. The piston rod is suspended on the nut on the slot-headed screw through a transversal arm. The maximum length of the movement of the plunger can be about 60 mm which requires 3000–6000 steps of the stepper motor. The precision of the dosage with such a number of steps can be in the order of 0.5–1% from the total volume of the cylinder and the repeatability 0.02–0.05% from the total volume, i.e., about 1–3 steps of the stepper motor. However, if only 1% of the volume of the cylinder is used for dosing, the repeatability of the dosage is in the order of about 1.5% from said volume.

The above values indicate that the present dosing techniques cannot provide very good dosing precision and that the precision and the repeatability further depend very much on the magnitude of the dosage relative to the total volume of the cylinder. One of the reasons for this is the fluctuation of the friction between the plunger and the cylinder which leads to inaccurate starting-up and stopping of the plunger. Another considerable reason for the inaccuracy is the multi-phase transmission chain between the stepper motor and the plunger, the sum of the tolerances of the transmission chain being high and the repeatability of movements low because of this. In addition, the mutual differences of the steps of the stepper motor, which are nominally of the same length, are actually considerably large. This problem has been perceived in present liquid dosing members and the intention has been to compensate for it by using a large number of steps so that the mutual differences of steps are equalized. However, the result is that 1/20–1/50 of the total volume of the cylinder is typically the smallest amount of liquid which can be dosed with a reasonable repeatability of 1%. When smaller dosages are needed, a dosing space with a smaller cross-section is required. Because of this it has been necessary to provide the present analyzers with numerous different dosing members which increase the size and the price of the analyzer.

One of the main problems of the present dosing techniques is the wearing of the walls of the cylinder and that of the teflon-seal of the plunger which moves in the cylinder. This further decreases the precision of the dosing and, therefore, the condition of the parts should be monitored. The monitoring and changing of the parts, in turn, increase the operating expenses of the equipment. In order to mitigate the problem of wearing, the teflon-seals have been made very massive but then the friction increases so that it has been necessary to also make the reduction gear transmitting the movement of the plunger more massive. Thus it was necessary to place the dosing device, because of its size, separately from the dosing point and the cylinder is joined to the moving dosing tip by a plastic tube. The movements, deformation, increase of the area and the volume, and thermal expansion of such a tube further impair the repeatability of the dosing. Another alternative for decreasing the wearing of the parts is to slow down the movement of the plunger but this decreases the capacity of the dosing device which is a considerable drawback in an expensive analyzer which is required to be effective.

SUMMARY OF THE INVENTION

The purpose of this invention is to provide for a dosing method where said wearing and capacity problems are avoided and where, before all, the precision and the repeatability of the dosing are essentially improved from what has been achieved with the above-described, known technique. The dosing method according to the invention is characterized in that the change in the volume of the liquid space limited by flexible bellows, which are propelled freely back and forth, is provided by a movement between different positions of the actuator which is transmitted without a sliding movement in the transmission mechanism to the bellows so that it provides a reversible deformation in the liquid space; that the dosing equipment is calibrated by driving the actuator between its different positions which can be repeated precisely; and by measuring the sizes of thus obtained dosages. The dosing of the amounts of liquid, the sizes of which are known, is carried out by selectively repeating said movements between the positions of the actuator.

One of the most important features of the invention is to replace the cylinder, provided with a plunger and used by known dosing devices, by flexible bellows which are freely movable back and forth, with precisely repeatable changes in volume being caused in the liquid space limited by such bellows. Thus there is no friction in the liquid space, no wearing occurs, and no errors resulting from such actions occur in the dosing. A special advantage of the bellows is to provide the necessary changes in volume of the liquid space by minimum deformation of the bellows, whereby the dosing precision is retained in long-term use and a long service life of the equipment is achieved.

Another essential feature of the invention is to eliminate the sliding movement, which occurs in previous dosing members, from the mechanism of the actuator transmitting the movement to the liquid. This is possible because the transmission chain between the actuator and the bellows which are deformed flexibly can be made very short, whereby rolling bearings are sufficient for the transmissions, the reciprocating movements of the bearings being extremely well repeatable. In addition, according to some of the applications of the invention the movement of the actuator can be converted into that of the bellows without using any kind of transmitting bearing.

The third essential feature of the invention, which is made possible by the two above-mentioned ones, is the calibration of the equipment for specific movements between the positions of the actuator, the dosing according to the invention being thereafter based on a precise repetition of the movements. In previous dosing members the moving area of the plunger of the cylinder is calibrated by presuming the movement to be linear and the steps of the actuator, such as a stepper motor, to be the same size. Thus a dosing area was obtained from which a dosage of the desired size could be freely selected which then was dosed by moving the actuator through a certain length. The price of the freedom of choice was a low precision and repeatability of the dosing. In the invention, on the contrary, the said principle of constantly adjusting the size of the dosage has been omitted in purpose and, instead, a number of movements between the positions of the actuator, which can be precisely repeated, is calibrated. This makes it possible to utilize the high repeating precision of different positions of the actuator, and the mutual differences between the positions, which so far have formed a considerable source of errors of the dosing precision, remain without significance. When the dosing precision up until now has been in the magnitude of one step of the stepper motor, it can be reduced in accordance with the invention to about 1/1000 of a step.

For the dosing according to the invention, a sufficient number of different size dosages are produced using the steps or combinations of steps between different positions of the actuator, the magnitudes of which are measured and from which the desired dosage sizes can be selected thereafter. A few tens of different size dosages are generally needed, in practice, the dimensions of which can be recorded into the memory of the analyzer and which can then be used as the basis of calculating the end results. Furthermore, by using the stepper motor with a large number of steps, and by increasing or decreasing the volume of the liquid space restricted by the bellows in the operating range of the stepper motor in an unlinear way, it is possible to calibrate a range of dosage sizes which correspond to suitable round numbers even better than dosages of corresponding sizes produced by the known technique, taking into account the large error margin of the latter. In addition, the end result in the invention is naturally calculated from a precise, calibrated dosage size and not from an approximate round number as in the known technique.

The precise repeatability of the dosages achieved by the invention results in that the size of the dosages can vary within a larger area than before. The dosage size, which is 1/250–1/500 of the total volume of the liquid space, can still be dosed, according to the invention, with a repeatability of 1%. Because of this, the analyzer manages with a smaller number of dosing members, only one in the best case, whereby the equipment becomes simpler and its size is decreased to perhaps only one tenth of the previous size. Due to the invention, the dosing member lasts a long time without its dosing precision being impaired, without it needing to be monitored, and without worn parts having to be replaced. A lighter than ever dosing member can be taken near the dosing point, whereby the dosing channel becomes small and errors resulting from it are insignificant. It is also possible to build the dosing member according to the invention as a part of the moving dosing tip of the analyzer.

According to the invention the actuator used in the dosing can be provided by a motor, the rotational movement of the shaft driven by the motor being converted into a movement of the bellows. A stepper motor can be used as the motor which is calibrated by measuring the magnitudes of the dosages produced by its selected steps or combinations of steps. The advantage of the stepper motor is the large number of its steps and the precise repeatability of each step irrespective of the fact that the step size between the different steps varies considerably. The holding moment of the stepper motor is like a spring force, and the motor and the bellows are placed, in each step, with their transmission which does not contain sliding surfaces, into a certain position of equilibrium which always repeats itself precisely, whereby the dosage corresponding to the gap between the positions can be repeatably dosed with corresponding precision.

Converting the movement of the shaft rotated by the motor into a reciprocating movement of the bellows can be carried out, according to the invention, by a cam connected to the shaft. When using a stepper motor as the motor, it can be used to step in opposing directions in the area of a half circle at the most. The cam can be connected to the reciprocating, movable bellows by a rolling bearing which is rigidly attached to the bellows and situated against the cam. The bearing is, for instance, a ball bearing surrounding the cam and providing a circular path independent of the precision of the cam. It is essential in view of the invention that the bearing and the bellows are able to move freely without friction caused by any external element. In addition to the conventional cam, the invention can employ, for instance, a cam which is shaped like a part of an Archimedean or a logarithmic spiral.

Alternatively, a draw-thread or a drawing cord which is wound around the periphery of the shaft rotated by the motor can be used to move the bellows. These provide a linear movement of the bellows the length of which can be directly proportional to the angle of rotation of the shaft. On the other hand, it is also possible to arrange the dependence in question as a nonlinear one. The advantage of the solution is that the cylindrical bellows retain its symmetry throughout its movement.

When a range of dosage sizes is needed where the sizes of the dosages increase logarithmically, it is preferred to transmit the movements of the actuator, which vary linearly along their length, into movements of the bellows so that the changes of the volume of the liquid space limited by the bellows vary in a nonlinear way. The solution is realized, for instance, by the above-mentioned cam belonging to the shaft rotated by the motor. The displacement of the cam in the lateral direction of the shaft is increased or decreased nonlinearly as a function of the angle of rotation. An alternative solution is to move the bellows using the draw-thread or drawing cord connected thereto and branched in two, one of the branches being attached to a stationary attachment point and the other one, by drawing on which the bellows are moved, being connected to the actuator. By guiding the draw-thread or the drawing cord using the roller bearing situated between the bellows and the branching point of the thread or the cord, the movement of the bellows can be maintained linear while the volume of the liquid space limited by the bellows changes nonlinearly.

The flexible, reciprocal bellows which form the liquid space, according to the invention, can be made of metal or plastic and they can be provided with an additional spring when needed. In view of the durability and the precision of repeatability of the movement, it is preferred that the change of volume of the bellows required by the dosing is only a small part of the total volume of the bellows. The bellows are constantly kept in a stressed state in a spring-like manner which is, in each position, balanced with the spring-like holding moment of the actuator such as the stepper motor.

A further object of the invention is the dosing equipment for dosing the amounts of liquid by the above-described method. The equipment comprises a space of liquid, the volume of which can be changed and which communicates with the dosing channel so that, by increasing or decreasing the volume of the liquid space, suction or injection is provided through the dosing channel. The equipment is characterized in that the liquid space is limited by flexible bellows which can be moved freely back and forth to provide reversible deformations which change the volume of the liquid space. The equipment includes an actuator which is connected to the bellows without transmissions containing sliding surfaces, to move the bellows. The actuator comprises positions which can be precisely repeated and which can be used to calibrate the device by measuring the sizes of the dosages produced by the movements between the positions, and the dosing is carried out by selectively repeating said movements of the actuator.

BRIEF DESCRIPTION OF THE DRAWINGS

In the following the invention is described in more detail with the aid of examples and with reference to the appended drawings where

FIG. 9 shows a modification of the equipment according to FIGS. 6 to 8 where the bellows are moved by a draw-thread branched in two, one branch of the draw-thread being stationary attached and the other branch being wound on the shaft;

FIG. 10 shows a modification where the draw-thread winding on the shaft moves the bellows through a swinging crank arm;

FIGS. 11 and 12 show the dosing equipment according to the invention where the dosing space is formed by short bellows moved by a piezo rod, the space being at its largest and at its smallest in the FIGS.;

DESCRIPTION OF THE PREFERRED EMBODIMENTS

Figure 1:
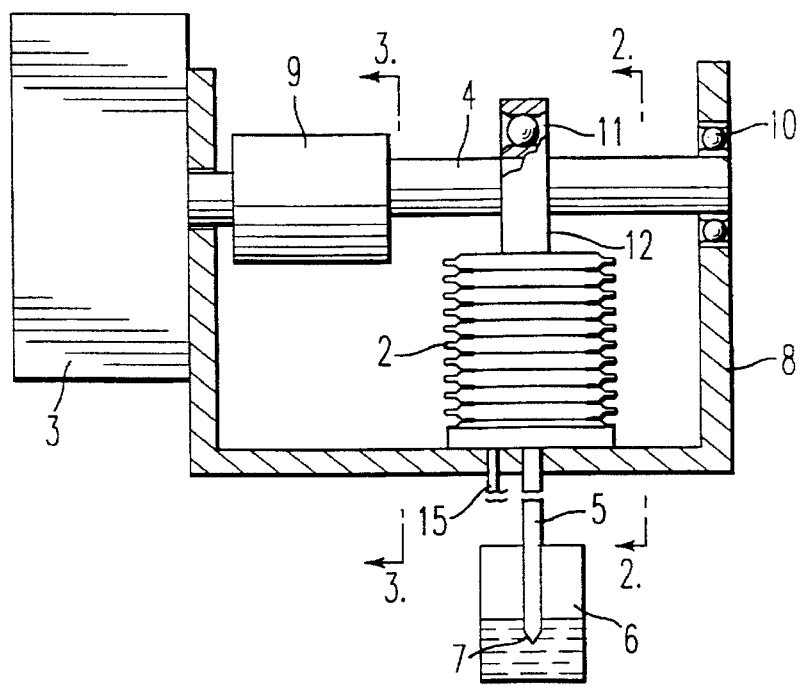
FIG. 1 shows dosing equipment according to the invention where the dosing space is formed by bellows moved by a cam shaft which is rotated by a stepper motor.
Figure 2:
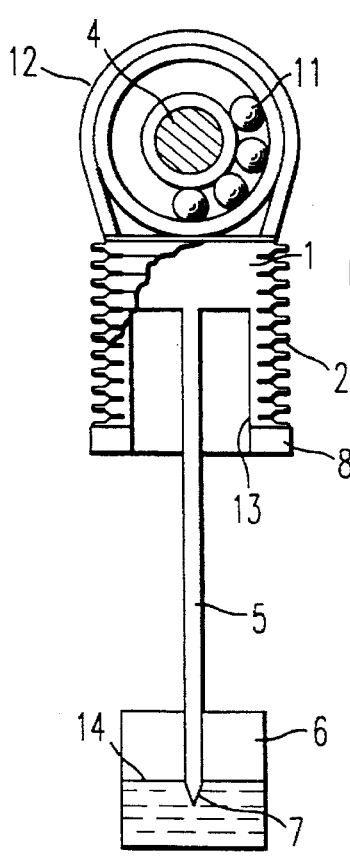
FIG. 2 shows the equipment according to FIG. 1, as seen from the direction II—II of the cam shaft, in the phase where the volume of the bellows is at its largest.
Figure 3:
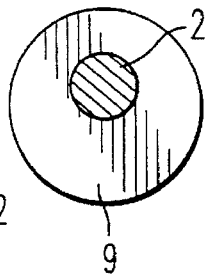
FIG. 3 is section III—III of FIG. 1.

FIGS. 1 to 5 show an embodiment of the invention where dosing space 1, which is filled with the dosed liquid and the volume of which can be changed, is formed by flexible metal bellows 2 which are movable back and forth with the aid of cam shaft 4 which is rotated in opposite directions in the area of a half turn and driven by stepper motor 3. FIGS. 1 to 3 show the equipment in the position where the volume of bellows 2 is at its maximum, and FIGS. 4 and 5 in a position where the volume of bellows 2 is at its minimum. Dosing space 1 is connected, through pipe 5 which serves as a dosing channel, to dosing tip 7 in small rinsing basin 6, through which the suction and spraying of the amounts of liquid provided by the equipment are carried out. When transferring from the position according to FIGS. 4 and 5 to the position according to FIGS. 1 to 3, the equipment sucks the largest possible amount of dosed liquid and sprays it out when returning to the position according to FIGS. 4 and 5.

Referring to FIG. 1, the bottom of bellows 2 are rigidly attached to support frame 8 which also supports stepper motor 3 with shafts 4, 9 used by it. Said shaft comprises axial portion 9 with respect to motor 3 and cam portion 4 as an extension of it, the end of the cam portion being supported by support frame 8 through ball bearing 10. Cam shaft 4 is surrounded by another ball bearing 11 which is rigidly attached to the upper end of bellows 2 with the aid of collar 12 circling around it. The end of flexible bellows 2 thus follows the movement of cam portion 4 and bearing 11 provided by the rotation of shafts 4, 9 in the lateral direction of the shaft. The vertical component of this movement provides the change in the volume of dosing space 1 limited by bellows 2, and thus the suction or injection of the amount of liquid of the corresponding volume through dosing tip 7. In addition, flexible bellows 2 receive, by bending, a smaller horizontal lateral movement of cam 4 which, per se, is without significance in view of the dosing.

Figure 4:
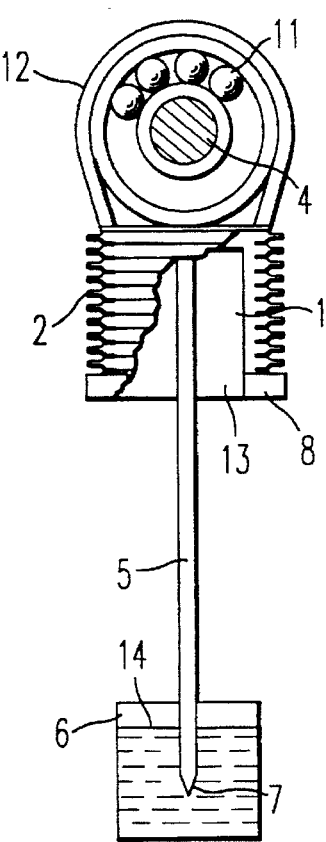
FIG. 4 is similar as FIG. 2 but it shows the equipment in the phase where the volume of the bellows is at its smallest.

FIGS. 2 and 4 show that flexible bellows 2 form the generally cylindrical casing of dosing space 1 which is moved back and forth along with cam 4 and bearing 11, jacket portion 13, which is rigidly connected to supporting frame 8, being installed inside the casing so that the dosing space is left between the bellows and said jacket portion 13. Pipe 5 which forms the dosing channel and is axial to bellows 2, extends from the end of jacket portion 13 and can be taken for dosing to small rinsing basin 6 where the dosing tip 7 of the channel is kept, during the dosing, under the surface 14 of the liquid in order to prevent splashing. When necessary, the dosing space 1 can be provided with one or more additional channels 15, as seen in FIG. 1, for filling or emptying the space.

The dosing equipment according to FIGS. 1 to 5 is calibrated for use in a stepping operation, by using stepper motor 3, from one position to another and by precisely measuring the magnitudes of the liquid dosages produced by these movements which are then recorded in the memory of the equipment for later use. The path of stepper motor 3 which comprises a multi-tooth, magnetic rotor and a surrounding stator which is selectively magnetized by electric current, is divided in the area of a half turn into about a hundred steps which are nominally of the same length, for instance, the lengths of which vary considerably in reality. On the other hand, these steps are typical in having an extremely high individual repeatability, i.e., the motor can be see very precisely into the same positions over and over again. When stepper motor 3 moves from one position to another, the rotational movement of shaft 9 causes cam 4 to transfer in the lateral direction of the shaft so that bellows 2, which are bonded to the cam with the aid of bearing 11 and collar 12, are stretched or reduced, changing the volume of dosing space limited by the bellows, which in turn causes the suction or spraying through dosing tip 7. Since there are no sliding surfaces between stepper motor 3 and bellows 2, but only ball bearings where the reciprocating, rolling movements are precisely reversible, the reproduction fidelity of the movements of the bellows and the changes of the volume of dosing space 1 essentially correspond to the repeatability of the different steps and step combinations of the stepper motor. A certain calibrated movement of stepper motor 3 can thus be used to repeatably dose an amount of liquid the magnitude of which is very precisely known.

Figure 5:
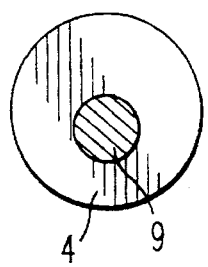
FIG. 5 is a section corresponding to FIG. 3 with the equipment being in the phase corresponding to FIG. 4.

The lateral shift of cam 4 between the extreme positions according to FIGS. 3 and 5, which can, according to the above, correspond to about one hundred nominally equally large steps of stepper motor 3, is carried out so that the shifts and the corresponding changes in the volume of dosing space 1 are very small upon the first steps of the motor, but increase gradually reaching their maximum in the middle of the lateral movement, after motor 3 has stepped about 50 steps and after shaft 9 has rotated through 90° in order to start decreasing again after that when approaching the extreme position according to FIG. 5 where bellows 2 and dosing space 1 are compressed to their smallest. With the rotation movement of stepper motor 3 where the increase of the rotational angle is linear, a nonlinearly proceding change in volume is thus provided in dosing space 1 which can be used to calibrate an extensive range varying in a logarithmic scale of different dosage sizes within the reciprocating movements in the area of a half turn of the motor.

After the calibration is carried out, the equipment is ready for use in precision dosing where the dosages can be selected from precalibrated dosage sizes and which is based on the repetition of the calibrated movements of the stepper motor, i.e., the repetition of the steps or step combinations between certain positions. It is easy to find dosages from the abundant dosage size range offered by the rotating stepper motor and the cam, which very precisely correspond to those round numbers which are typically used in liquid dosing and whose "errors", i.e., deviations from the absolute round numbers, are known on the basis of the calibration and are taken into account in calculating the results of the analyses.

Figure 6:
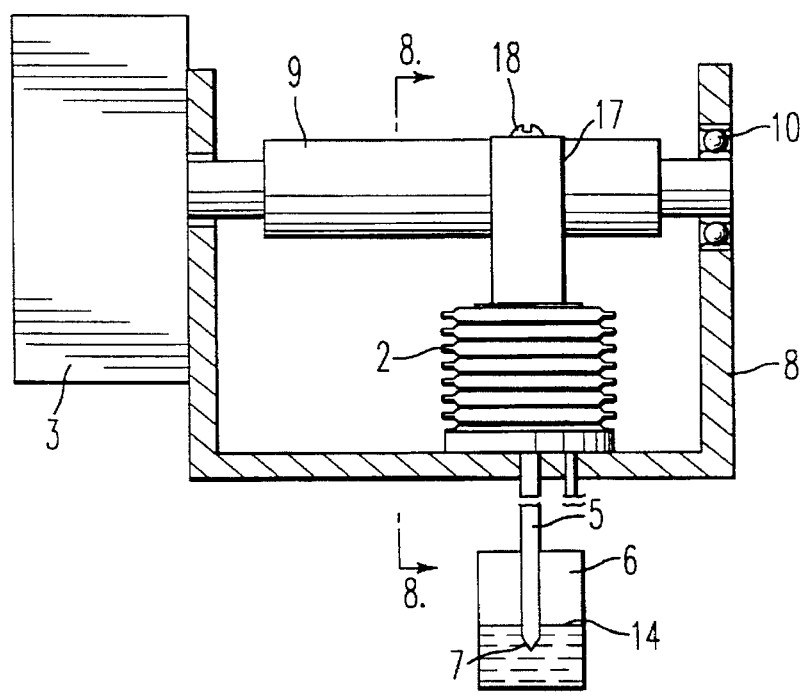
FIG. 6 shows, corresponding to FIG. 1, dosing equipment according to the invention where the dosing space is formed by bellows moved by a draw-thread which is wound around the shaft.
Figure 7:
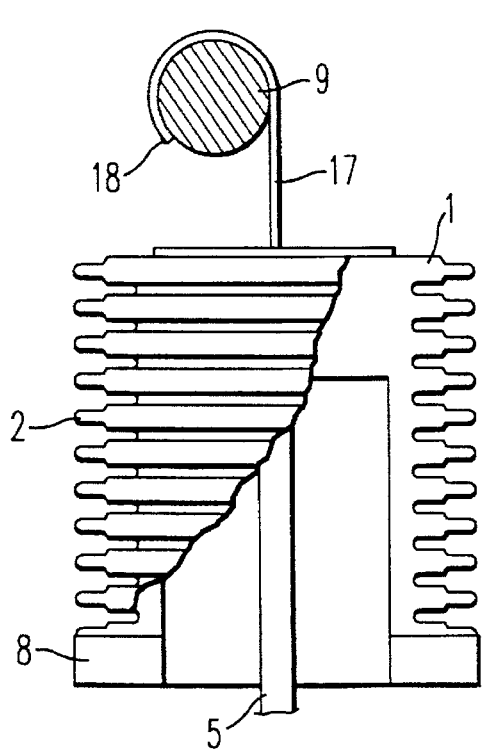
FIG. 7 shows the equipment according to FIG. 6, as seen from the direction of the shaft, in the phase where the volume of the bellows is at its largest.
Figure 8:
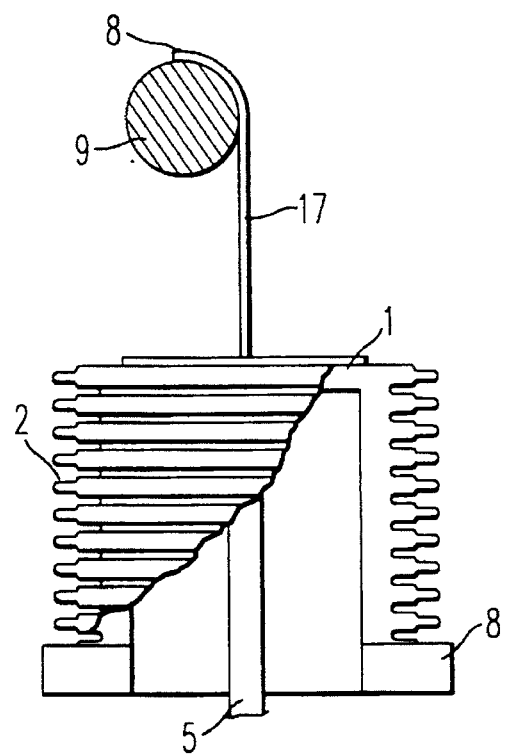
FIG. 8 is similar to FIG. 7, but it shows the equipment in the phase where the volume of the bellows is at its smallest, and as section VIII–VIII of FIG. 6.

FIGS. 6 to 8 show the dosing equipment according to the invention where cam 4 according to FIGS. 1–5 is replaced with a straight shaft used by stepper motor 3, to which shaft bellows 2 are connected through draw thread 17. Draw thread 17, which is preferably of metal, is attached at its one end to the upper end of bellows 2, and at its other end to rotating shaft 9 with the aid of fastener 18. The stretching of bellows 2 is carried out so that shaft 9 and draw thread 17 pull them against the spring force of the bellows, the force correspondingly drawing up the bellows when the shaft is rotated in the opposite direction. When necessary, an additional spring (not shown) connected to bellows 2 can be used to assist in the drawing. FIG. 7 shows the equipment when dosing space 1 limited by bellows 2 is at its largest and FIG. 8 shows the equipment when space 1 is at its smallest.

The solution according to FIGS. 6–8 is characterized in that the movements of bellows 2 are linear and that the change in the volume of dosing space 1 is directly proportional to the rotational angle of shaft 9 rotated by the stepper motor. The equipment can be calibrated according to the above, even though the range of dosage sizes remains narrower than in the application according to FIGS. 1–5 because of said rotational angle and the linear dependence on the change in the volume.

The above drawback is eliminated in the modification of the equipment according to FIG. 9 where draw thread 17 is branched in two and one of the branches 19 is attached to shaft 9 rotated by the stepper motor and the other branch 20 to stationary attachment point 21. Draw thread 17 is guided between the upper end of bellows 2 and branching point 22 of the thread by ball-bearing 23 which keeps the movement of the bellows linear. When shaft 9 is rotated and draw thread 17 moves in accordance with the arrows in FIG. 9, the rotation of the shaft which increases linearly provides, however, a nonlinear change in the volume of dosing space 1 limited by the bellows. If draw thread 17 with its branch 20 leading to attachment point 21 is linear in the smarting situation, the stepwise rotation of shaft 9 causes branching point 22 to move to the right in FIG. 9 and bellows 2 to be stretched by the pulling of thread 17, of which the movement is first accelerated but then slows down after the middle of the movement.

In the solution according to FIG. 9, it is further possible to replace the rotation of draw thread 17 around shaft 9 by the rotating cam according to FIGS. 1–5 to which thread 17 is connected, whereby the range of the calibrated dosage sizes can be made even larger.

FIG. 10 shows modified equipment where bellows 2 are joined at their upper end to crank arm 24, the other end of which is rotatably joined, with the aid of ball-bearing 25, to frame 8 of the equipment, and the other end is propelled by draw thread 17 which rotates onto shaft 9 driven by the stepper motor. The solution enables a decrease of the movements of bellows 2 and changes in the volume of dosing space 1 which, however, stay directly proportional to the rotational angle of shaft 9. In FIG. 10, crank arm 24 is at its lower position, whereby dosing space 1 is at its smallest. The upper position of the arm where the dosing space is at its largest, is indicated by a line of dots and dashes in the Figure.

FIGS. 11 and 12 show an application of the dosing device according to the invention where dosing space 1 is formed by short bellows 2 which are compressed linearly by a stretching and decreasing piezo rod 26. Dosing space 1 changes its volume nonlinearly when the bellows are first compressed slowly from the center thereof and then faster both from the center and the creases of the bellows. The repeatability of the positions of tip 27 of piezo rod 26 which moves bellows 2 is good, per se, and it can be improved, when necessary, by an optical encoder (not shown). The equipment can be thus calibrated to a range of different sizes of liquid dosages in the above-described way.

Figure 13:
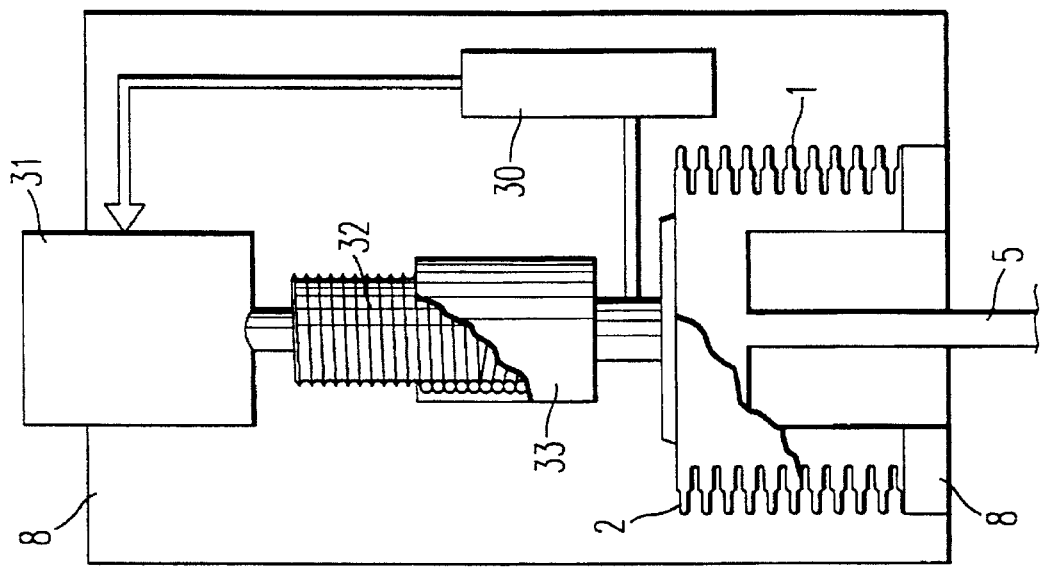
FIG. 13 shows a modification where the bellows forming the dosing space are moved by a linear stepper motor.

FIG. 13 shows an embodiment of the dosing equipment according to the invention where the bellows limiting dosing space 1 are moved with the aid of linear stepper motor 3' which is connected to the end of the bellows through rigid arm 28. Motor 3' is joined, by rolling bearings 29, to frame 8 of the equipment in such a way that the motor moves back and forth with respect to the frame, propelling bellows 2 along with it. The equipment can be calibrated to different sizes of liquid dosages in the above-described way.

Figure 14:
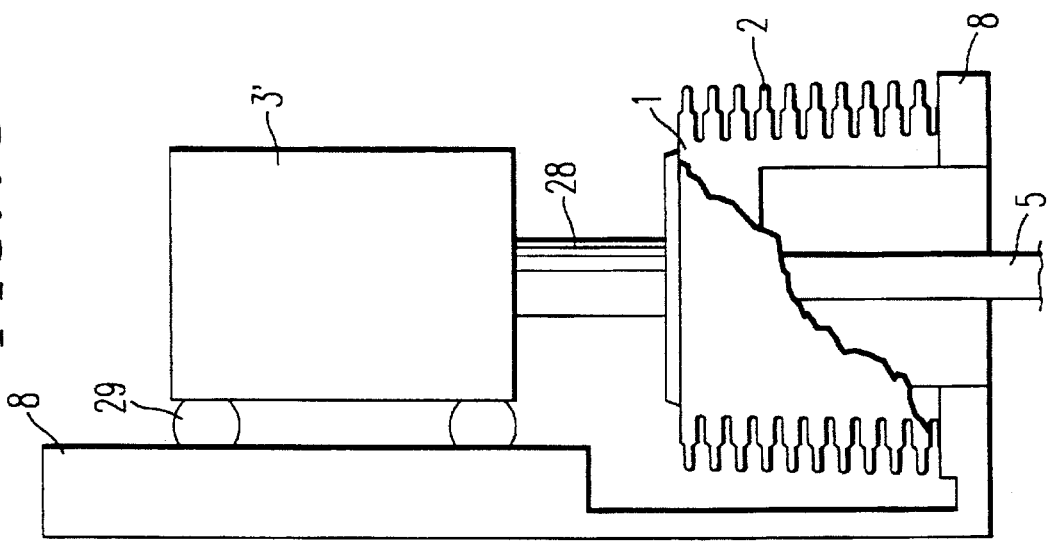
FIG. 14 shows a modification where the bellows are moved by a servomotor controlled by a linear decoder.

FIG. 14 shows an embodiment of the dosing equipment where bellows 2 which form dosing space 1 are propelled with the aid of servomotor 31 controlled by linear encoder 30. The bottom of bellows 2 and motor 31 are rigidly joined to frame 8 of the equipment. Motor 31 rotates ball screw 32 which is projected into chuck nut 33 which, in turn, is rigidly joined to the upper end of bellows 2 and to encoder 30. The rotational movement of ball screw 32 propels chuck nut 33 and bellows 2 in the axial direction of the screw and the chuck nut. Encoder 30 monitors the movements of the upper end of bellows 2 and adjusts servomotor 31 to precisely repeatable positions. The calibration of the equipment to different sizes of liquid dosages is carried out in the above-mentioned way.

A dosing equipment according to the invention which essentially corresponds to the one illustrated in FIGS. 1–5 was tested using metal bellows the diameter of which was 25 mm and the maximum dosing volume 2000 μl and servo-motor Astrosyn type 14 PM-KOO 1. The cam which was used employed less than half of the maximum volume, about 850 μl. The following measuring results were obtained in the test arrangment where the dosing device was connected, with the aid of the dosing tip according to patent application FI-922805, to the vessel of a microbalance, with the discharge opening being under the surface of the water all the time. The calibration of the dosing positions was carried out so that the step of the stepper motor, which was closest to the lower dead point of the bellows, was the starting position recognized by an opto-sensor. The bellows and the dosing tip were full of water at room temperature without temperature control.

The reading of the microbalance was recorded and the stepper motor took the number of seeps as recorded in the first column from the left of table 1; i.e., it sucked water into the tip. The lightening of the weighing vessel was registered and the dosed amount was calculated from the difference and dosed back to the weighing vessel by returning to the starting position. Each time the measurement was repeated ten times and the averages of the weighing results were calculated as well as the absolute and percentual standard deviations. The results are presented in Table 1.

TABLE 1

| Number of steps | Dosing (μg) | Standard deviation % | Standard deviation % from the total volume |
| --- | --- | --- | --- |
| 1 | 0.207 | 1.0 | 0.0001 |
| 2 | 0.728 | 1.0 | 0.0001 |
| 4 | 1.711 | 1.8 | 0.0002 |
| 8 | 5.446 | 12 | 0.0014 |
| 16 | 17.053 | 14 | 0.0016 |
| 28 | 46.166 | 28 | 0.0033 |
| 44 | 104.282 | 15 | 0.0018 |
| 172 | 804.060 | 41 | 0.0048 |

The results show that the proportion of the maximum volume to the varying of the repeatability of the smallest volume was nearly 1 000 000 to 1 for the bellows, the maximum volume of which was 2000 μl. These bellows were used in measuring purposes so that the area of repeatability could be found out by weighing. The analyzers normally used employ bellows which are about one tenth of the size of the bellows used in the measurements, whereby the repeatability is correspondingly, absolutely better. A linear mode of use is to always start from the starting position, whereby the repeatability is the highest, but the range of volumes is limited to a volume of 100 or 200, for instance, depending on the number of steps of the stepper motor. Another way is to utilize all the possible step combinations which are then 5000 or 20 000 by the above-mentioned numbers of steps, for instance. Thus by roughly halving the repeatability, dosages can be calibrated which correspond to all nominal equal volumes of the conventional, known injection dosing so precisely that they fall within the latter-mentioned limits of repeatability. However, when calculating the analysis results, said equal volumes are not used, but rather the calibrated, precise dosage sizes.

The strength of the bellows in the dosing according to the invention was tested by using bellows which were otherwise similar to the ones used in the above-described test, only their diameter was 12.5 mm. 5 000 000 dosages were carried out using the bellows, which corresponds to the number of dosings during the typical life of dosing equipment. It was stated that by each dosage size used, the change from the calibrated dosage size was less than 0.2%.

The testing of the thread-driven dosing bellows essentially according to FIGS. 6–8 was carried out in the following way:

The same bellows were used as in the above-described test and a two-phase stepper motor Sankyo MSJS 400 All which comprises 400 steps. The change in volume of the bellows on one step of the stepper motor was about 10 microliters. The steps according to following Table 2 were taken from the same starting point and the size of the dosage thus obtained was measured. The measurement was repeated 10 times on each step spacing. The average and the relative variation constant of the dosage were calculated from the results and they are presented in the table. In addition, the dosed amount is divided in the table by the number of the steps taken, whereby a reading is obtained of how long the approximate spacing is between the steps taken. The average and deviation are calculated from these.

TABLE 2

| Number of steps | Dosage (mg) | Relative variation constant (%) | | Amount of dosage/ step (mg) |
| --- | --- | --- | --- | --- |
| 4 | 37.987 | 0.026 | | 9.497 |
| 5 | 46.539 | 0.036 | | 9.308 |
| 6 | 58.449 | 0.034 | | 9.742 |
| 7 | 66.538 | 0.028 | | 9.505 |
| 8 | 78.675 | 0.032 | | 9.834 |
| 9 | 86.162 | 0.010 | | 9.574 |
| 10 | 100.636 | 0.019 | | 10.064 |
| 16 | 161.926 | 0.024 | | 10.120 |
| | Average | 0.026% | Avg. | 9.705 +/−2.9% |

The results indicate that when assuming the step spacings of the stepper motor as constants, the relative variation coefficient is 2.9% but if the step spacings are calibrated, the variation decreases to less than one part in a hundred.

It is clear to those skilled in the art that the different applications of the invention are not limited to the above examples but can vary within the appended claims. The bellows forming the dosing space can also be constructed so that the liquid is outside the bellows. It is possible, especially, to combine elements included in different examples, i.e., the dosing spaces formed by the bellows, and motors or other corresponding actuators which increase or decrease the dosing space, into different device assemblies where the interdependent relationship between the movement of the actuator and the change in the volume of the dosing space can be linear (directly proportional) or non-linear.

We claim:

1. A method for quantitative precision dosing of small amounts of liquid by use of a liquid space defined by a flexible bellows which is connected to a dosing channel, said bellows being adapted to move freely back and forth by means of an actuator having a range of precisely repeatable positions, movements of the actuator between said positions being transmitted to the bellows through a transmission mechanism without sliding movement in said transmission mechanism, the method comprising the steps of:

calibrating the actuator by driving the actuator through a number of said positions, each driving movement of the actuator between two selective positions of said positions, producing a reversible change in a volume of the liquid space and a transfer of a corresponding volume of liquid by suction or injection through said dosing channel, and measuring said transferred amounts so as to establish a range of calibrated doses of liquid; and performing dosing by selecting a calibrated dose of liquid and driving the actuator between the two selected positions used for the calibration of the selected dose, the movement of the actuator being transmitted to the bellows to produce a change of the volume of the liquid space and suction or injection of an amount of liquid forming the dosed amount corresponding to said selected dose.

2. A method according to claim 1, wherein the actuator is formed by a motor, the method comprising the further step of converting a rotational movement of a shaft driven by the motor into the movement of the bellows.

3. A method according to claim 2, wherein the motor is a stepper motor, the method comprising the further step of calibrating the stepper motor by measuring sizes of the dosages provided by different steps or step combinations of the stepper motor.

4. A method according to claim 3, comprising the further step of driving the stepper motor by rotating the stepper motor in opposite directions within an area of a half turn.

5. A method according to any one of the claims 2, 3 or 4, comprising the further step of causing reciprocating movements of the bellows by using a cam joined to the shaft which is rotated by the motor.

6. A method according to any one of claims 2, 3 or 4, comprising the further step of moving the bellows by using a draw thread wound around a periphery of the shaft.

7. A method according to claim 6, comprising the further step of transmitting the movements of the actuator, the lengths of which vary linearly, into movements of the bellows so that the changes in volume of the liquid space vary nonlinearly.

8. A method according to claim 7, comprising the further step of moving the bellows using the draw thread joined thereto which is branched into two branches at a branching point, one of the branches being attached to a stationary attachment point and the other branch, which by drawing moves the bellows, being connected to the actuator.

9. A method according to claim 8, comprising the further step of guiding the draw thread by using a roller bearing situated between the liquid space and the branching point of the thread.

10. A method according to claim 2, comprising the further step of moving the bellows by using a drawing cord which is wound around a periphery of the shaft.

11. A method according to claim 10, comprising the further step of moving the bellows using the drawing cord joined thereto which is branched into two branches, one of the branches being attached to a stationary attachment point and the other branch which by drawing moves the bellows, being connected to the actuator.

12. A method according to claim 11, comprising the further step of guiding the drawing cord by using a roller bearing situated between the liquid space and the branching point of the cord.

13. A method according to claim 1, comprising the further step of situating the liquid space inside the bellows, said bellows being essentially cylindrical.

14. An equipment for quantitative precision dosing of small amounts of liquid selected from a range of predetermined liquid doses, the equipment comprising:

a liquid space limited by flexible bellows, said flexible bellows having a range of repeatable bellows positions corresponding to different volumes of said liquid space and being freely movable back and forth to enable reversible movements between said bellows positions, the liquid space volume changes produced by said movements defining said range of liquid doses, and said liquid space communicating with a dosing channel so that selective movements of the bellows together with a thereby increased or decreased volume of the liquid space produce selective doses from said range of liquid doses by means of suction or injection of liquid through the dosing channel; and an actuator which is, without transmissions containing sliding surfaces, connected to the bellows for moving the bellows, the actuator comprising a range of positions which can be precisely repeated for bringing the bellows into said repeatable bellows positions, the dosing being effected by selective steps of the actuator between said actuator positions causing the bellows to be moved between the corresponding bellows positions and a dose of liquid to be sucked or injected.

15. A dosing equipment according to claim 14, wherein the actuator is provided by a motor, a rotational movement of a shaft driven by the motor being converted into a movement of the bellows.

16. A dosing equipment according to claim 15, wherein the motor is a stepper motor.

17. A dosing equipment according to one of claims 15 or 16, wherein the shaft rotated by the motor is provided with a cam, a shift of the cam in a lateral direction of the shaft being transmitted by using a bearing, into a movement of the bellows.

18. A dosing equipment according to claim 17, wherein the bellows are rigidly attached to the bearing which is against the cam of the shaft.

19. A dosing equipment according to one of claims 15 or 16, wherein a draw thread, which is wound around a periphery of the shaft and which propels the bellows, is arranged between the shaft and the liquid space.

20. A dosing equipment according to claim 19, wherein the draw thread is branched into two branches at a branching point and is joined to the bellows, one of the branches being attached to a stationary attachment point and the other branch being connected to the actuator for propelling the bellows by pulling on the other branch.

21. A dosing equipment according to claim 20, wherein the draw thread is guided, between the bellows and the branching point of the draw thread, past a roller bearing which serves as a guide.

22. A dosing equipment according to claim 15, wherein a drawing cord, which is wound around a periphery of the shaft and which propels the bellows, is arranged between the shaft and the liquid space.

23. A dosing equipment according to claim 22, wherein the drawing cord is branched into two branches at a branching point and is joined to the bellows, one of the branches being attached to a stationary attachment point and the other branch being connected to the actuator for propelling the bellows by pulling on the other branch.

24. A dosing equipment according to claim 23, wherein the drawing cord is guided, between the bellows and the branching point of the drawing cord, past a roller bearing which serves as a guide.

25. A dosing equipment according to claim 14, wherein the actuator is formed by a piezo rod.

26. A dosing equipment according to claim 14, wherein the liquid space is situated inside the bellows, the bellows being substantially cylindrical.

* * * * *

UNITED STATES PATENT AND TRADEMARK OFFICE
CERTIFICATE OF CORRECTION

PATENT NO. : 5,638,986
DATED : JUNE 17, 1997
INVENTOR(S) : TUOMINEN ET AL

It is certified that error appears in the above-identified patent and that said Letters Patent is hereby corrected as shown below:

Column 2, line 57, after "liquid", delete "," and insert --.--.

Signed and Sealed this

Twelfth Day of May, 1998

Attest:

BRUCE LEHMAN

Attesting Officer     Commissioner of Patents and Trademarks